United States Patent
Brainard et al.

(10) Patent No.: US 7,363,494 B2
(45) Date of Patent: Apr. 22, 2008

(54) METHOD AND APPARATUS FOR PERFORMING ENHANCED TIME-BASED AUTHENTICATION

(75) Inventors: John G. Brainard, Sudbury, MA (US); Burton S. Kaliski, Jr., Wellesley, MA (US); Ronald L. Rivest, Arlington, MA (US)

(73) Assignee: RSA Security Inc., Bedford, MA (US)

( * ) Notice: Subject to any disclaimer, the term of this patent is extended or adjusted under 35 U.S.C. 154(b) by 1109 days.

(21) Appl. No.: 10/010,769

(22) Filed: Dec. 4, 2001

(65) Prior Publication Data

US 2003/0105964 A1  Jun. 5, 2003

(51) Int. Cl.
*H04L 9/00* (2006.01)
*H04K 1/00* (2006.01)
*G06F 7/04* (2006.01)
*G06F 17/30* (2006.01)

(52) U.S. Cl. .................... 713/168; 713/169; 713/170; 713/182; 713/183; 713/184; 713/185; 713/186; 380/232; 726/27; 726/28; 726/29; 726/30

(58) Field of Classification Search ................. 713/168
See application file for complete search history.

(56) References Cited

U.S. PATENT DOCUMENTS

| | | | |
|---|---|---|---|
| 4,104,694 A | 8/1978 | Hargrove | |
| 4,145,568 A | 3/1979 | Ehrat | |
| 4,145,569 A | 3/1979 | Ehrat | |
| 4,317,957 A | 3/1982 | Sendrow | |
| 4,320,387 A | 3/1982 | Powell | |
| 4,369,332 A | 1/1983 | Campbell, Jr. | |
| 4,438,824 A | 3/1984 | Mueller-Schloer | |
| 4,471,216 A | 9/1984 | Herve | |
| 4,509,093 A | 4/1985 | Stellberger | |
| 4,536,647 A | 8/1985 | Atalla et al. | |
| 4,543,657 A | 9/1985 | Wilkinson | |
| 4,575,621 A | 3/1986 | Dreifus | |
| 4,578,530 A | 3/1986 | Zeidler | |
| 4,582,434 A | 4/1986 | Plangger et al. | |

(Continued)

FOREIGN PATENT DOCUMENTS

EP           0140013 B1        5/1985

(Continued)

OTHER PUBLICATIONS

American National Standard for Financial Services. "Financial Services Key Management Using the DEA," American Bankers Association, copyright 1992, 1999, pp. i-iii, 1-9, 34-52.

(Continued)

*Primary Examiner*—Ayaz Sheikh
*Assistant Examiner*—Longbit Chai
(74) *Attorney, Agent, or Firm*—BainwoodHuang

(57) ABSTRACT

A time-based method for generating an authentication code associated with an entity uses an authentication code generated from a secret, a dynamic, time-varying variable, and the number of previous authentication code generations within the particular time interval. Other information such as a personal identification number (PIN) and a verifier identifier can also be combined into the authentication code.

29 Claims, 5 Drawing Sheets

U.S. PATENT DOCUMENTS

| | | |
|---|---|---|
| 4,599,489 A | 7/1986 | Cargile |
| 4,605,820 A | 8/1986 | Campbell, Jr. |
| 4,609,777 A | 9/1986 | Cargile |
| 4,614,861 A | 9/1986 | Pavlov et al. |
| 4,720,860 A | 1/1988 | Weiss |
| 4,731,841 A | 3/1988 | Rosen et al. |
| 4,800,590 A | 1/1989 | Vaughan |
| 4,819,267 A | 4/1989 | Cargile et al. |
| 4,849,613 A | 7/1989 | Eisele |
| 4,856,062 A | 8/1989 | Weiss |
| 4,885,778 A * | 12/1989 | Weiss ........................ 713/184 |
| 4,890,323 A | 12/1989 | Beker et al. |
| 4,928,098 A | 5/1990 | Dannhaeuser |
| 4,944,008 A | 7/1990 | Piosenka et al. |
| 4,998,279 A | 3/1991 | Weiss |
| 5,016,276 A | 5/1991 | Matumoto et al. |
| 5,023,908 A | 6/1991 | Weiss |
| 5,046,125 A | 9/1991 | Takizawa |
| 5,058,161 A | 10/1991 | Weiss |
| 5,097,505 A | 3/1992 | Weiss |
| 5,101,430 A | 3/1992 | Periou |
| 5,168,520 A | 12/1992 | Weiss |
| 5,180,902 A | 1/1993 | Schick et al. |
| 5,206,905 A | 4/1993 | Lee et al. |
| 5,237,614 A | 8/1993 | Weiss |
| 5,280,527 A | 1/1994 | Gullman et al. |
| 5,361,062 A | 11/1994 | Weiss et al. |
| 5,367,572 A | 11/1994 | Weiss |
| 5,377,270 A * | 12/1994 | Koopman et al. .......... 380/262 |
| 5,479,512 A | 12/1995 | Weiss |
| 5,485,519 A | 1/1996 | Weiss |
| 5,592,553 A | 1/1997 | Guski et al. |
| 5,657,388 A | 8/1997 | Weiss |
| 5,717,756 A | 2/1998 | Coleman |
| 5,732,133 A | 3/1998 | Mark |
| 5,737,421 A | 4/1998 | Audebert |
| 5,802,176 A | 9/1998 | Audebert |
| 5,887,065 A | 3/1999 | Audebert |
| 5,937,068 A | 8/1999 | Audebert |
| 6,539,092 B1 * | 3/2003 | Kocher ........................ 380/252 |

FOREIGN PATENT DOCUMENTS

| | | |
|---|---|---|
| EP | 0148960 B1 | 7/1985 |
| EP | 0566811 A1 | 10/1993 |
| EP | 0678836 B1 | 10/1995 |
| EP | 1050789 A2 | 11/2000 |
| FR | 2607544 | 6/1988 |
| JP | 59-119630 | 5/1991 |
| JP | 2835433 | 6/1997 |
| JP | 2884338 | 4/1999 |
| WO | 88/06826 | 9/1988 |

OTHER PUBLICATIONS

European Patent Office, European Search Report, International Application EP 00 30 3741, date of completion of search Jan. 16, 2002, 2 pages.

Freier, et al. "The SSL Protocol," Version 3.0, http://home.netscape.com/eng/ssl3/ssl-toc.html, Mar. 1996, pp. 1-3, 1-26, and Table of Contents, http://home.netscape.com/eng/ssl3/ssl-toc.html, pp. 1-3.

Ferreira, "The Smart Card: A High Security Tool in EDP", Philips Telecommunication and Data Systems Review, Phillips Telecommunicatie Industrie N.V. Hilversum, NL, Sep. 1989, vol. 47, No. 3, pp. 1-19.

RSA Laboratories, a division of RSA Data Security, Inc. "PKCS #5 v2.0: Password-Based Cryptography Standard." Mar. 25, 1999, copyright 1991-1999, pp. 1-30.

Shamir, "Identity-Based Cryptosystems and Signature Schemes", Lecture Notes in Computer Science, Springer Verlag, New York, NY, US, 1985, pp. 47-53.

Standard Specifications for Public Key Cryptography, IEEE P 1363 / D 13 (Draft Version 13), Institute of Electrical and Electronics Engineers, Inc., New York, NY, Nov. 12, 1999, pp. 1, 4-6, 53-57, 71-73.

\* cited by examiner

METHOD AND APPARATUS FOR PERFORMING ENHANCED TIME-BASED AUTHENTICATION

FIELD OF THE INVENTION

The invention relates to computer-based methods and systems for time-based authentication and more particularly, to authentication methods and systems that distinguish between multiple authentication attempts during a pre-defined authentication time interval.

BACKGROUND OF THE INVENTION

Methods for authenticating an identity of an entity are known that are based on something the entity knows, something the entity has, a biological characteristic of the entity (sometimes referred to as something the entity is) or some combination of those things. One such computer-based authentication method involves the communication of a secret that is unique to a particular entity or user. The entity that is seeking authentication transmits the secret to a verifier who authenticates the identity of the entity. Typically, an entity communicates both identifying information (such as a user name) and a secret (such as a password) to the verifier. The verifier typically possesses records that associate a secret with each entity. If the verifier receives a secret that matches an appropriate record, the authentication of the entity is successful. If the verifier receives an incorrect secret, the authentication fails.

Time-based authentication systems also associate an entity with a secret, typically a number, which is unique to that entity. These systems generally perform some algorithmic processing of the secret to generate an authentication code that is ultimately used to authenticate the entity. Some time-based systems use a dynamic variable to calculate a non-predictable authorization code that ultimately authenticates the entity. Here, "non-predictable" means that the authorization code is not predictable by a party that does not know the associated secret, the algorithm for calculating the code, or both. The dynamic variable may comprise any code, typically a number, which is defined and determined by the interval of time in which an authentication code is generated. The dynamic variable can change according to any interval of time, e.g., 2 minutes, 5 minutes, 1 hour and the like. Because in these systems the authentication code changes from time to time, intercepted authentication information has a limited value because it cannot be used for authentication in the future.

The user may employ a device to algorithmically compute the correct authentication code for a particular time. The algorithm is typically provided to the user in the form of a hardware token loaded with a program for carrying out the predetermined algorithm, although it may be provided as software executing on a general-purpose computer. The device may also allow the user to input a second, personally selected secret, such as a personal identification number (PIN) in order to generate a correct authentication code. Only a correctly entered PIN produces a correct authentication code for a particular time. One such device is the SECURID authentication token, available from RSA Security Inc. of Bedford, Mass. These devices can display the generated authentication code to the user, who may then communicate the authentication code to the verifier.

Although the dynamic nature of the generated authentication codes in these systems avoids problems inherent with using fixed authentication codes, if such a device is left unattended it is still vulnerable to attack. A third party attacker may enter multiple guesses for the personally selected secret values during an authentication time period. By associating each personally selected secret with the resulting authentication code generated by the device, an attacker may mathematically solve or otherwise determine the personally selected secret. A similar problem could occur if the user mistakenly provides one or more incorrect secret values and communicates one or more incorrect authentication codes on an insecure channel before communicating a correct authentication code generated from a correct secret value. An eavesdropping attacker can obtain sufficient information from these exchanges to mathematically solve for or otherwise determine the personally selected secret. Although this form of attack could be thwarted by always transmitting the authentication code on a secure channel (such as one using encryption), such channels are not available in all environments or at all times. Thus, despite the security advantages of dynamic authentication code methods, some security disadvantages remain.

SUMMARY OF THE INVENTION

The invention relates to computer-based methods and systems for time-based authentication that offer increased resistance to attack by generating different dynamic authentication codes within a single time interval. Each authentication code is generated using a generation value, which is different for generation attempts within a time interval. In one embodiment, a combination function is employed that takes as input a secret, a dynamic value, a PIN value, and a generation value. (The combination function may also take as input a verifier identifier as well as other information.) Each authentication attempt during the same time interval uses a different generation value and, in some embodiments, the receipt of the PIN triggers a change in the generation value. Use of this generation value in the combination function makes it more difficult for an attacker to attack the system by generating or observing the generation of multiple authentication codes within a time interval, because information that previously was available to the attacker in the prior art systems is now hidden.

The combination function can be implemented using a wide variety of algorithms; the specific form of the algorithm comprises only an incidental part of the invention. For example, the combination function can mathematically combine the generation value with the dynamic value, and then encrypt the result using the secret (or a value derived from the secret) as a key. In another example, the generation value can be used to select a secret from a number of secrets, and that selected secret used as a key to encrypt the dynamic value.

Embodiments of the invention can be particularly effective, for example, in systems that combine a user secret, such as a PIN, with a dynamic value in a simple way, as can be typical for system with constrained resources. When the PIN is combined in a simple manner, multiple iterations of PIN entry within a time interval expose the PIN to attack. Embodiments of the invention in which the generation value is included in the combination function, and the authentication code is different for two successive authentication attempts are more resistant to such attacks.

In general, in one aspect, the invention relates to a method for generating an authentication code associated with an entity. The method includes retrieving a stored secret associated with the entity, determining a dynamic value associated with a time interval, receiving a PIN value, and determining a generation value responsive to a number of previous authentication code generations. This may be the number of previous authentication code generations within the same time interval as that used for the dynamic value or within another time interval. In some embodiments the receipt of the PIN triggers the determination of the generation value. The authentication code is generated by combining the secret, the dynamic value, the PIN and the generation value. The combination can occur in any order and by various means.

In general, in another aspect, the invention relates to a system for generating an authentication code associated with an entity. The system includes a data store storing a secret associated with the entity, a dynamic value subsystem for determining a dynamic value associated with a time interval, and a generation value subsystem for determining a generation value responsive to a number of previous authentication code generations. This may be the number of previous authentication code generations within the same time interval as that used for the dynamic value or within another time interval. The system also includes a combination function or subsystem for generating the authentication code by combining the secret, the dynamic value and the generation value.

In one embodiment, the secret is a stored secret associated with an entity. In another embodiment the secret is derived from the stored secret associated with an entity.

In one embodiment, the dynamic value is determined by reading a time-based counter (e.g., a clock or timer), and determining a dynamic value associated with a time interval identified in response to the counter reading. In another embodiment, the dynamic value is determined by generating a secret associated with that specific time interval. In yet another embodiment, the dynamic value is determined by selecting a predetermined secret associated with that specific time interval, and deriving the dynamic value from the predetermined secret, or using the predetermined secret directly.

In one embodiment, the generation value is determined by resetting the generation counter at the start of a time interval, and incrementing a generation counter for each generation of the authentication code during that time interval. This time interval may be the same time interval as used for generation of the dynamic value, or may be another interval. The generation counter can be incremented, upon an event that triggers generation of an authentication code, which may be entry of a PIN, a verifier identifier, actuation of a button or switch, or the passing of a time interval. In another embodiment the generation value is, or is derived from, a value selected from a number of predetermined generation values.

In one embodiment, a PIN is received, and the combination function combines the secret, the dynamic value, the generation value, and the PIN. The PIN can be received, for example, from a user via keyboard entry or by some other communication, or, in the case of the verifier, the PIN can also be received from a data store. In one embodiment, a verifier identifier is also received that is an identifier specific to a verifier. The combination function combines the secret, the dynamic value, the verifier identifier, and optionally the PIN.

The combination function can combine the various values in various ways, combining some values before others, encrypting or deriving values from one or more of other values, or using a value as a selection index to select one or more other values from a predetermined number of values.

In one embodiment, the authentication code that results is displayed. In another embodiment, the authentication code generated is compared to a received authentication code, to authenticate the entity.

BRIEF DESCRIPTION OF THE DRAWINGS

The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, the emphasis instead is placed on conveying the concepts of the invention.

DESCRIPTION OF THE INVENTION

Figure 1:
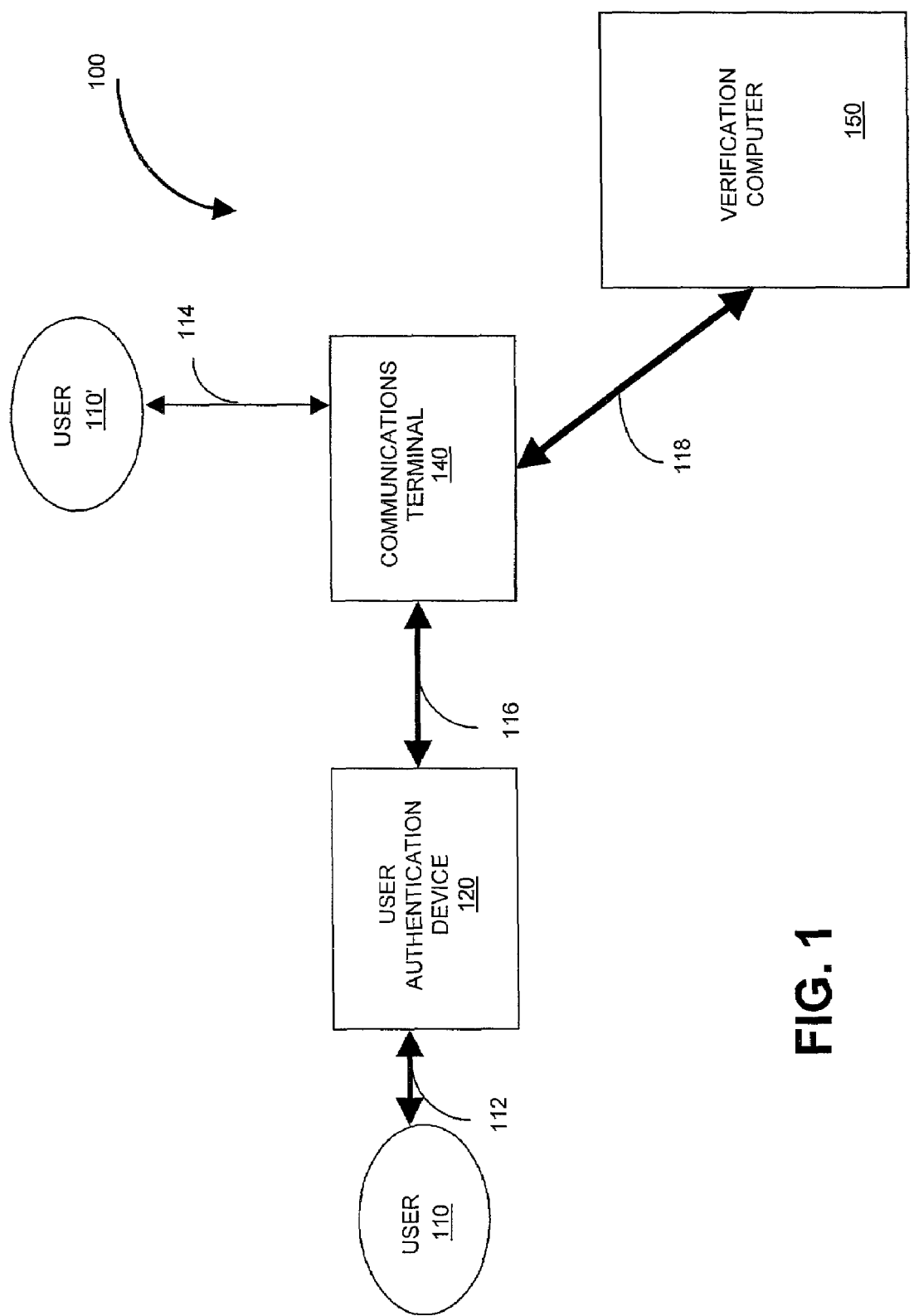
FIG. 1 is a diagram illustrating an embodiment of a system for securely authenticating the identity of the user.

Referring to FIG. 1, in one embodiment of a system 100 according to the invention, a verification computer 150 is used to help securely authenticate the identity of a user 110, 110'. As used herein, "authenticate" means to verify the identity of a user. Accordingly, "authenticate" and "verify" may be used interchangeably throughout. Also, although the specification will discuss, for simplicity, authorization of "users," it should be understood that "users" means any entity-requiring authentication such as, for example, a computer server. Authentication can result in the performance of one or more actions including, without limitation, providing access or privileges, taking action, or enabling some combination of the two. Access includes, without limitation: access to a physical location, communications network, computer system, and so on; access to such services as financial services and records, health services and records and so on; or access to certain levels of information or services. In various embodiments, the user 110, 110' and the verification computer 150 can be in the same location as the user 100, 100' or a location different from the user 100, 100'. The user 110, 110' may be located proximal to or far away from the verification computer 150. As noted above, the user 110, 110' is typically a person, but can be any entity requiring authentication in a particular context, including without limitation a computer or other device or machine.

As shown in FIG. 1, user 110 communicates with a user authentication device 120. The user authentication device 120 provides information that contributes to the process of authenticating the user 110. The user authentication device 120 may optionally provide a user interface 112. Communication between the user 110 and the user authentication device 120 can take place via this user interface 112. The user interface 112 can provide an input interface, an output interface, or both. An input interface enables the user 110 to communicate information to the user authentication device 120. The input interface can include, without limitation: a keypad or keyboard; one or more push buttons, switches or knobs; a touch sensitive screen; a pointing or pressing device; a trackball; a device for capturing sound, voice or handwriting; a device for capturing biometric input such as a fingerprint, retina or voice characteristic; and so forth. An output interface enables the user authentication device 120 to communicate information to the user and can include, without limitation: a visual display to support alphanumeric characters or graphics such as a LCD display, LED display; electrophoretic display; one or more light sources; a sound or voice generator; a vibration interface; and so forth. In some embodiments, the user 110 provides, via the user interface 112, identifying information (such as a user identifier, PIN, or password, or biometric characteristic), biological characteristics (such as a fingerprint, retina pattern, or voice sample), or possessions (such as physical keys, digital encryption keys, digital certificates, or authentication tokens) to the user authentication device 120.

The user authentication device 120 can have various forms in various embodiments of the invention, provided that the user authentication device 120 performs the functions required of the user authentication device 120 for secure authentication. The user authentication device 120 can be implemented in packages having a wide variety of shapes and form factors. For example, the user authentication device 120 can be a credit-card sized and shaped device, or can be much smaller or much larger. One credit-card sized embodiment of the user authentication device 120 includes a microprocessor with on-board memory, a power source, and a small LCD display. The embodiment optionally includes a keypad or buttons for entry of PIN, request of authentication information, or for other entry or interaction with the device 120. In another embodiment, a credit-card sized device 120 includes a processor with on-board memory that is used as a "smart card." In still other embodiments, a credit-card sized device 120 is a card such as a credit card including a magnetic strip or other data store on one of its sides. In other embodiments, the user authentication device 120 is a "key fob," that is, a smaller device with a display and battery that is sized and shaped to fit on a key ring. In still other embodiments, the user authentication device 120 is a desktop computer, laptop computer, or personal digital assistant (PDA). For example, the authentication device 120 can be implemented as a software program running on a general-purpose computer, possibly interacting with one or more other computer programs on the same or a different computer. In still further embodiments the user authentication device can be a cellular telephone, or specialized hardware embedded in a cellular telephone and adapted to interact with the cellular telephone's circuitry. Other sizes, shapes, and implementations are possible without departing from the spirit of the invention.

In some embodiments, the user authentication device 120 stores a secret that is used to authenticate the user 110. In one particular embodiment the stored secret is used to generate an authentication code for the user 110. The user authentication device 120 may also provide other information, or perform other calculations or combination functions, as described further below. For example, in one embodiment, in addition to storing a secret the device 120 receives a personally selected secret from the user 110 (such as a PIN or password) and generates a dynamic, non-predictable authentication code in response to the secret received from the user 110, the stored secret, and the current time. The user authentication device 120 optionally may also receive other input, such as an identification code associated with the verification computer, and use that additional information in the generation of the authentication code.

In the embodiment shown in FIG. 1, the user 110 has indirect access to a communications terminal 140 via the user authentication device 120. The communications terminal 140 can take various forms, including without limitation: a card reader; a device receptacle, cradle, or holder; a personal computer; a telephone; a personal digital assistant (PDA); a wireless transceiver; and so on. During the authentication process the user 110, 110' may directly communicate information to only the device 120, only the terminal 140, neither the device 120 nor the terminal 140, or both the device 120 and the terminal 140. Likewise, the communications terminal 140 may receive input from the user 110, 110' the device 120, or both.

In the embodiment shown in FIG. 1, user 110' has direct access to the communications terminal 140 via connection 114. Communication between the user 110' and the communications terminal 140 can take place via a communications terminal user interface 114. Like the device user interface 112, the communications terminal user interface 114 can include an input interface, an output interface, or both. The input and the output interfaces can take one or more of the forms described above for the device user interface 112.

The communications terminal 140 can optionally provide a device interface 116 for communications between the terminal 140 and the user authentication device 120. In one embodiment, this interface can take the form of a wired or wireless communications channel between the terminal 140 and the device 120, using standard or proprietary protocols. For example, in an embodiment in which the device 120 is a smart card and the terminal 140 includes a card reader, the communications interface 116 could be a wired serial communications link between the smart card and the reader. In another embodiment in which the device 120 is a token that has wireless communications capability and the terminal 140 includes a wireless transceiver, the interface 116 could be a wireless link. As another example, in an embodiment in which the card has a magnetic stripe (such as commonly found on a credit card), and the communications terminal 140 includes a magnetic stripe reader, the interface 116 could include the magnetic reader and the standard protocols used to communicate the information from the magnetic stripe on the card when the card is run through the reader.

The communications terminal 140 may provide a user interface 114 without providing a device interface for the device 120. For example, the terminal 140 may be a telephone that the user 110' uses to communicate authentication information to the verification computer 150. In such an embodiment the user authentication information may be represented as tones associated with a series of alphanumeric digits. In this embodiment the user 110' dials a telephone number to establish a communications connection with the verification computer 150 and performs a series of key presses on the telephone to communicate the alphanumeric user authentication information to the verification computer 150.

The communications terminal 140 communicates information to the verification computer 150 via a communications channel 118. The communications channel 118 may be any method and/or interface that enables communication of information to the verification computer 150 that is required to authenticate the identity of the user 110. The communications terminal 140 can communicate information generated by the user 110, 110', the device 120, or both, to the verification computer 150 over a communications channel 118. The communications terminal 140 and the verification computer 150 can implement the communication channel 118 through a variety of connections including standard telephone lines, LAN or WAN links (e.g., T1, T3, 56kb, X.25), broadband connections (ISDN, Frame Relay, ATM), and wireless connections. Connections between the communications terminal 140 and verification computer 150 can be established using a variety of communication protocols (e.g., TCP/IP, IPX, SPX, NetBIOS, Ethernet, RS232, and direct asynchronous connections). The verification computer 150 processes the information received from the communications terminal 140. The verification computer 150 can perform actions in response to authenticating the identity of the user 110. For example, the verification computer 150 can grant on-line access to data or physical access to restricted areas or physical items.

In some embodiments, the authentication code communicated over the communications channel 118 is designed to be different and unpredictable (to an observer without knowledge of the algorithm used to generate the authentication code) for each user authentication attempt. In certain embodiments this is accomplished by the use of a generation value, described in detail below.

For each user authentication attempt, the verification computer 150 receives user authentication information and verifies the received information. In some embodiments, the verification computer 150 performs an algorithmic calculations for each user authentication attempt that is substantially identical to the algorithmic calculation performed by the user authentication device 120 in order to authenticate the user. The verification computer 150 compares both copies of authentication information (i.e., the authentication information received over communications channel 118 and the authentication information generated by the verification computer 150) to determine if they match. If a match occurs, then the verification computer 150 authenticates the identity of the user. If the received and generated user information do not match, the user authentication attempt fails. In some embodiments, the verification computer may communicate positive or negative acknowledgement to the communications terminal 140 via the communications channel 118, and the terminal 140 may or may not communicate the acknowledgement to the device 120 or directly to the user 110'.

In other embodiments, in order to authenticate the user the verification computer 150 performs an algorithmic calculation on a received authentication code that "reverses" the algorithmic calculation performed by the user authentication device 120. In a simplistic example, the user authentication device 120 generates an authentication code by arithmetically combining a secret stored by the user authentication device 120 and a user-supplied PIN. In order to verify the user in this example, the verification computer retrieves from its records the PIN associated with the user and the secret stored on the user's authentication device. The verification computer 150 subtracts the user's PIN from the received authentication code. The verification computer 150 compares the result of the subtraction to the value of the secret stored on the user's authentication device. If they match, the user is authenticated. If they do not match, user authentication fails. In certain of these embodiments the verification computer 150 decrypts a value encrypted by the user authentication device 120 using symmetric key encryption or asymmetric encryption techniques, such as public key encryption.

Figure 2:
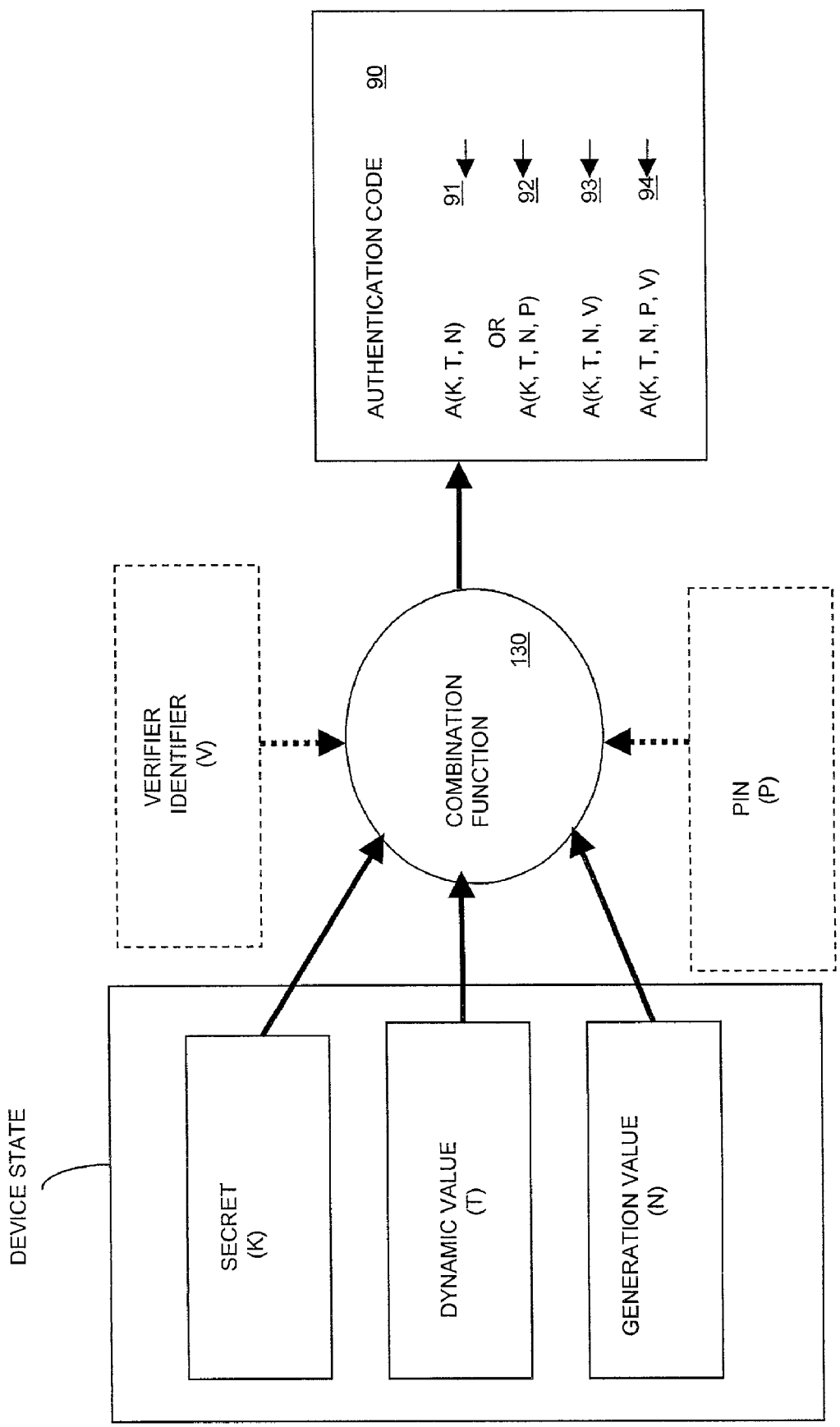
FIG. 2 is a diagram illustrating various values that are combined by an embodiment of a combination function to generate an authentication code.

FIG. 2 depicts one embodiment of the user authentication device 120 and verification computer 140 of FIG. 1 in which various values are combined by a combination function 130 to generate an authentication code 90. In general, the combination function 130 generates an authentication code 90 using the state of the user authentication device 120. FIG. 2 shows, as examples of device state that may be used, the secret (K) stored by the user authentication device 120, a dynamic, time-varying value (T) generated by the user authentication device 120, and a generation value (N), which will be discussed in greater detail below. Other examples of device state include the time and date of manufacture of the user authentication device 120, the amount of time since generation of the last authentication code, an encoding of the latitude and longitude of the location of manufacture of the user authentication device 120, an encoding of the location of the user authentication device 120 at the time of generation of the user authentication device (using GPS or enhanced GPS, for example), or other similar quantities. The device state used by the combination function 130 may include one or more of the quantities described above. The combination function 130 may also optionally use user state (shown in phantom view in FIG. 2 as PIN (P)) or verifier states (shown in phantom view in FIG. 2 as verifier identifier (V)) to generate an authentication code (A) 90 for the user. Other examples of user state include biometric information such as retinal scans and fingerprints, and identifying information such as social security number, birthdate (possibly including time of birth) or employee codes. Verifier state may include information identifying the verification computer 150, such as IP address or processor serial number.

The combination function 130 may be implemented as firmware instructions executed by an embedded microprocessor. In other embodiments, the combination function 130 may be implemented in special-purpose hardware, such as an application specific integrated circuit, a field-programmable gate array, or other programmable logic device. In still other embodiments, the combination function 120 may be implemented as a software application program running on a general-purpose desktop, laptop, or handheld computing device.

FIG. 2 depicts a number of embodiments for generating the authentication code 90. In one embodiment, an authentication code 91 is constructed from a stored secret (K), a dynamic value (T), and a generation value (N). In this embodiment, the authentication code (A) 91 is represented as a function of elements K, T, and N, which is written A (K, T, N). The combination function may be implemented in the device 120, the communications terminal 140, or some combination of the two.

The stored secret (K) is a unit of information such as a numerical value that is uniquely associated with, and typically manufactured into, the device 120. In one particular embodiment, the secret (K) is 128 bits in length. In a typical hardware implementation of the device 120, the secret (K) is stored inside the device 120 such that it is very difficult to extract the secret (K) from the device. In a typical software implementation of the device 120, the secret (K) is preferably stored in a secure data store accessible to the device 120. In addition to being accessible to the device 120, the secret (K) is also stored in a secure data store accessible to the verification computer 150. In other embodiments the secret (K) may be derived from a master secret ($K_{MASTER}$), as described in U.S. Pat. No. 6,985,583, the contents of which are incorporated herein by reference. The secret is preferably a value that is chosen from a large number of possible values such that it would be difficult for an opponent who had access to the output of the combination function 130 to guess the secret by trying each possible secret value to see if it resulted in the observed authentication code.

The dynamic value (T) is a unit of information such as a hexadecimal or decimal numerical value that changes over time. In one embodiment, the dynamic value (T) is uniquely associated with a particular pre-determined time interval demarcated by a particular starting time and ending time. The time interval is not required to be of any particular length nor is every time interval required to be the same length. The only requirement is that the time interval schedule be roughly synchronized between the device 120 and the verification computer 150. Methods that may be used to synchronize the device 120 and the verification computer 150 are described in U.S. Pat. No. 4,885,778, titled "Method and Apparatus for Synchronizing Generation of Separate, Free Running, Time Dependent Equipment." A time interval could have the length of a minute, an hour, a month, a year, or any other convenient length of time. The dynamic value (T), identifying a particular time interval, remains constant for all authentication codes generated within that particular time interval.

For example, in one embodiment, a constant time interval of a minute is used, and the dynamic value is the number of minutes since Midnight, Jan. 1, 1980. In another embodiment, a time interval of an hour is used and the dynamic value is the number of seconds since Noon, Dec. 15, 1999. The number of seconds is determined for the first second of each time interval. In such an embodiment, the time from which counting begins may be a secret that is shared between the device 120 and verification computer 150. The interval period length(s) may also be secrets that are shared between the device 120 and the verification computer 150.

In another embodiment, the length of each time interval is an hour. Since, there are 24 hours in a day, each hour can be identified by a unique value such as the values 1 through 24; each of the 365 days of the year can be uniquely identified by the values 1 through 365; and each year can be identified by the number of the year, for example 2001. These three values, each identifying an hour, a day or a year, are combined in such a manner to produce a value that uniquely identifies one and only one particular one-hour time interval. This one hour time interval can be indicated by a particular (hour-day-year) combination. For example, the value 100232001 would uniquely identify the period of time between 9:00 am and 10:00 am on the $23^{rd}$ day (023) of the year 2001 (2001), that is Jan. 23, 2001. Similarly, the value 170322001 would uniquely identify the time period between 4:00 pm and 5:00 pm on the 32nd day (032) of the year 2001 (2001), that is Feb. 1, 2001. Other variations will be immediately understood by those of ordinary skill in the art.

In one embodiment, the dynamic value (T) is provided as the output of a time clock function. The time clock function provides the current time to the dynamic value function. The dynamic value function determines the appropriate dynamic value (T) in response to the data provided by the clock function. In one such embodiment, implemented in a device having a clock and a processor, the dynamic value (T) is generated by a clock that is a counter that is set to an initial value and is incremented every second. This clock counts the number of seconds since the initially configured time. Every sixty seconds the clock signals the dynamic value function, which reads the clock, increments the dynamic value (T), and stores the incremented dynamic value as the dynamic value (T) for that time interval. In some embodiments the time value is provided in ISO-8601 format.

Generation value (N) is a unit of information, such as a numerical value, that is uniquely associated with each authentication code generated during a particular time interval. For example, the generation value may be changed such that no two authentication codes generated within the same time interval by the combination algorithm 130 are associated with the same generation value (N). In one embodiment, the generation value is generated by a counter that is reset at the beginning of each time interval and that is incremented upon each generation of an authentication code. In this embodiment, the counter value itself may be used as the generation value. Alternatively, the counter output can be provided as an input to a cryptographic or arithmetic function that determines the generation value. In still other embodiments, more than one secret ($K_1, K_2, \ldots K_m$) may be provided during each time interval and the generation value (N) may be used to select which secret from the set of secrets ($K_1, K_2, \ldots K_m$) to use.

In one embodiment, the secret (K), the dynamic value (T) and the generation value (N) are provided to the combination function 130 for combination as authentication code A (K, T, N) 91. The combination of the secret (K) the dynamic value (T) and the generation value (N) can take place in any order and may use one or more various combination methods. For example, in one simplistic embodiment, the values (K, T, N) are EXCLUSIVE-ORed with each other to arrive at a resulting authentication code. In another embodiment, the values (K, T, N) are provided as input to a one-way function. A one-way function is any mathematical function that maps a universe of input values to a universe of output values in such a way that knowledge of the output of the function does not allow one to reconstruct the input provided. An example of a one-way function is a hash function, such as MD4, MD5, or SHA-1. In one particular embodiment, a block cipher, such as RC6 or Rijndael, use the secret (K) as the key and the dynamic value (T) as the data in order to generate the combination of (K) and (T). In one of these embodiments, the combination function 130 is designed such that each different generation value (N) that is combined with a constant stored secret (K) and a dynamic value (T) results in a different authentication code value. As noted above, (K) and (T) may be combined at the user authentication device 120 and (N) may be combined with that result at the communication terminal 140.

Still referring to FIG. 2, user state, such as a personal identification number (PIN) value (P) may also be provided as input to the combination function 130. A PIN is a unit of information such as an alphanumeric character string, or a strictly numerical value, uniquely associated with the user 110, 110'. Preferably, the identity or value of the PIN is a secret known only to the user 110, 110' and the verification computer 150. The PIN value (P) is preferably stored in a manner accessible to the verification computer 150 that protects it from being compromised. The PIN value (P) may be the actual PIN, that is the number or alphanumeric unit that is provided by the user, or the PIN value (P) can be the result of processing of the PIN by one or more other functions. For example, the PIN (P) can be mapped to another value with a one-way function, such as a hash function, or a password derivation function before being provided as an input to the combination function 130. Derivation functions may be used that combine the password with other information, referred to as a salt. The salt need not be a secret value. An iterative function may also be included in a derivation function. A number, referred to as an iteration count, can be used to indicate how many times to perform an underlying function by which the password is derived. The incorporation of the iteration count into the derivation function increases the effort required to derive a password. A modest number of iterations, for example 1000, is not likely to be a burden for legitimate parties when computing a key, but it will be a significant burden for attackers. If the PIN value is a large random value, a small iteration count may be used.

In one embodiment, the combination function 130 combines the PIN value (P) with the secret (K), the dynamic value (T), and the generation value (N) to generate an authentication code A (K, T, N, P) 92. The combination function 130 can combine these values (K, T, N, P) in any order to generate the authentication code 92. In one particular embodiment, the user authentication device 120 combines (K, T, N) to generate an authentication code A (K, T, N) 91 as described above. The combination function 130 then combines the generated authentication code 91 with the PIN (P) to generate an authentication code 92 that is a function of (K, T, N, P). The PIN (P) may be combined with A (K, T, N) by prepending or appending the PIN (P) to A (K, T, N), by arithmetically adding the PIN (P) to A (K, T, N), or using a block cipher. The same steps may be used for both combinations, or they may be different—for example, (K) may be provided as key input to a block cipher and (T, N) as data inputs to the block cipher, and the PIN combined with the block cipher result by an EXCLUSIVE-OR operation. In another embodiment, the PIN value (P) and the generation value (N) are combined first, and then the dynamic value (T) and the secret (K) are combined with the result. In another embodiment, the dynamic value (T) and the secret (K) are combined, and the PIN value (P) and the generation value (N) are combined with the result. The combination can take place at the same time for example, as the values are provided as input to a single function, or in stages, as some values are combined with others. Certain ones of the combinations may take place on the user authentication device 120 and other may take place on the communication terminal 140.

In one embodiment, when the user provides the (PIN) value to the device 120, the communication of the PIN (P) triggers a change in the generation value (N). For embodiments in which receipt of the PIN value (P) triggers a change in the generation value (N), the generation value (N) may be reset to a default value each time the dynamic value (T) changes (i.e. at the transition of a dynamic value time interval). Communication of the PIN to the device 120 causes the current generation value (N) to be provided to the combination function and also causes the generation value to be changed to reflect the additional authentication code generation within the time interval. In one such embodiment, the generation value is incremented. In this embodiment the generation value (N) is immediately available for calculating a second authentication code during a time period. For the embodiments described above in which K, T, and N are combined first and the PIN (P) is combined last, entry of the PIN (P) may trigger recombination of the K, T, and N values. The combination of the K, T, and N values may stored in a register for eventual combination with the PIN (P) the next time it is received by the user authentication device 120. In certain of these embodiments, the combination of K, T, and N is reset at the beginning of a new time period.

Various embodiments of the device 120 can receive input of the PIN in various ways. These can include without limitation, user input of the PIN (P) via a keypad, a keyboard, a touch sensitive screen, selection with a pointer or mouse, handwriting recognition, voice recognition and so on. The PIN can also be communicated from another device via electrical or electromagnetic means.

Figure 2A:
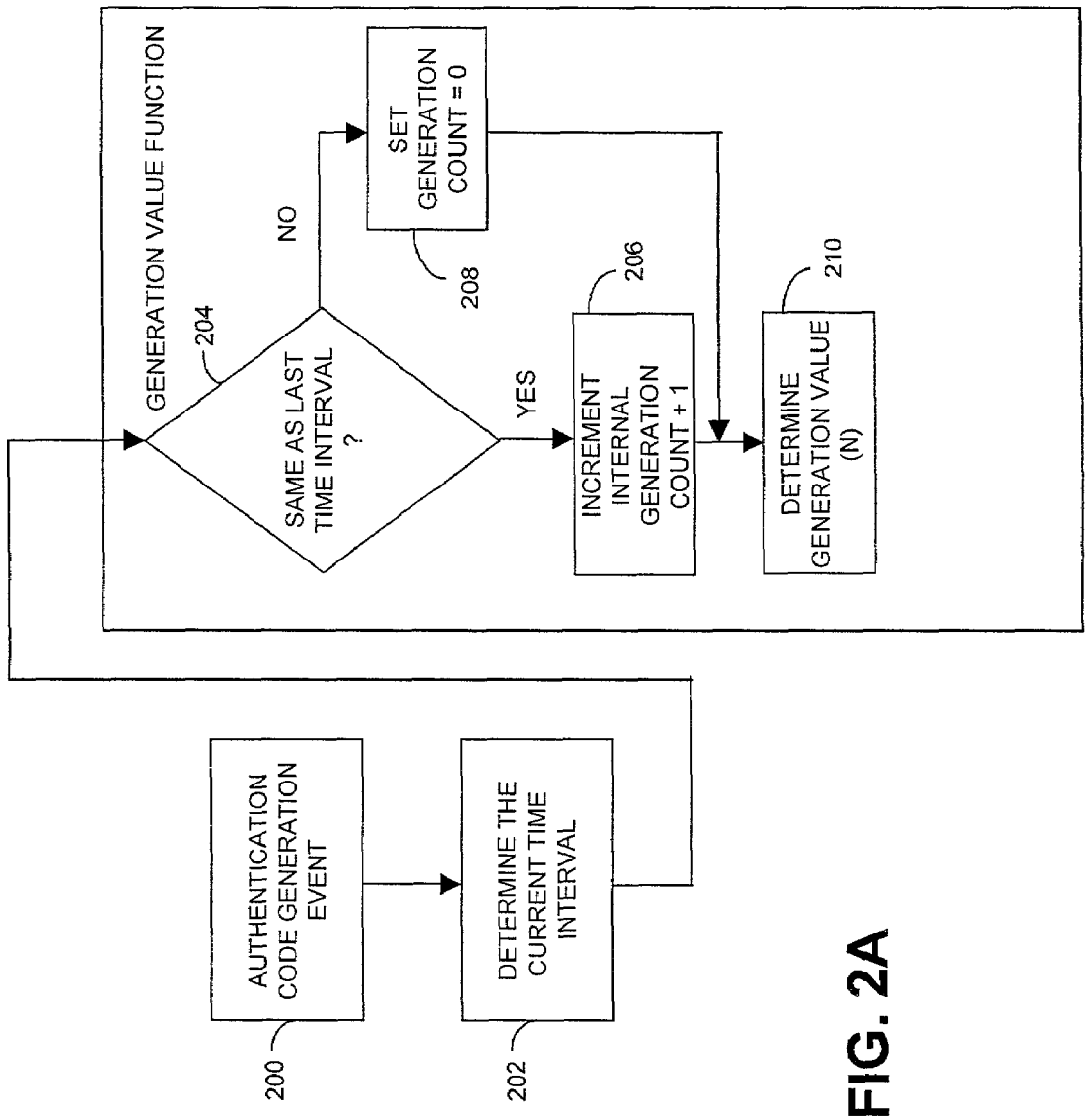
FIG. 2A is a flowchart showing, in one embodiment, the steps taken to generate the generation value (N) from FIG. 2.

FIG. 2A depicts one embodiment of a method to generate an authentication code 90 using the generation value (N). An authentication code generation event is sensed (step 200). In one embodiment the authentication code generation event may be a request by a user 110, 110' to generate an authentication code 90. In another embodiment, the authentication code generation event may be the provision of a PIN value (P) by the user 110, 110'. In still other embodiments, the authentication code generation event may be the expiration of a predetermined time interval.

The user authentication device 120 determines the current time interval (step 202). In one embodiment, the user authentication device 120 determines the current time interval by referencing the current dynamic value (T). If the dynamic value (T) has not changed since the last authentication code generation event (step 204), then the internal generation count is incremented (step 206). If the dynamic value (T) has changed since the last authentication code generation event the generation count is reset (step 208). The user authentication device 120 uses the internal generation count to determine the generation value (N) (step 210). As noted above the generation value (N) may be the generation count itself or the result of a one-way function applied to the generation count. Once determined, the generation value (N) may be combined with one or more of the secret (K), the dynamic value (T), the PIN (P) or the verifier identifier (V), or any combination of those quantities.

Referring once again to FIG. 2, in another embodiment, a verifier identifier (V) is also provided as input to the combination function 130. The verifier identifier (V) is a value associated with the identity of a particular verification computer (150) or group of verification computers. The use of the verifier identifier (V) allows the same user authentication device 120 (with the same secret (K)) to be used with verifiers operated by different entities without giving a particular entity information that could be used to impersonate the user to another entity. Techniques for implementing such systems are described in U.S. Pat. No. 6,985,583, the contents of which are incorporated herein by reference. In one embodiment, the verifier identifier (V) is a verifier-specific secret. In another embodiment, the verifier identifier (V) is public information that the user 110 can communicate to the device 120 so that the device 120 can be used with a particular verification computer 150.

In one embodiment, the combination function 130 combines a verifier identifier (V), a secret (K), a dynamic value (T) and a generation value (N) to generate an authentication code 93. The combination function can combine these values (V, K, T, N) in various ways and in any order. For example, the combination function can optionally first combine (K, T, N) to generate an authentication code 91 and then combine the authentication code 91 with a verifier identifier (V) to generate an authentication code 93 as a function of (K, T, N, V). Likewise, in an embodiment that also includes the PIN value (P), the combination function can optionally first combine (K, T, N, P) to generate an authentication code 92 and then combine the authentication code 92 with a verifier identifier (V) to generate an authentication code 94 that is a function of (K, T, N, P, V). In one particular embodiment, the verifier identifier (V) is combined first with the stored secret (K) so that the combination will be useful for multiple values of (T), (N), and (P).

Before being combined by the combination function 130, the verifier identifier (V) can be processed by one or more other functions. For example, the verifier identifier (V) could be mapped to another value via a one-way function, and that result combined by the combination function 130 to generate an authentication code. The one-way function could be implemented from a hash function such as MD2, MD5 or SHA-1 or a pseudo-random number generator.

In some embodiments, input of the verifier identifier (V) into the device 120 can indicate to the device that a new user authentication code is requested. Consequently, input of the verifier identifier (V) into the user authentication device 120 can trigger a change in the generation value (N) stored inside the user authentication device 120 before it is combined by the combination function 130.

Various embodiments of the user identification device 120 can receive input of the verifier identifier (V) in various ways. These can include, for example, user input of the verifier identifier (V) via a keypad, a keyboard, a touch sensitive screen inter-operating with a pressing device, selection with a pointer or mouse, voice capture and recognition etc. Input of the verifier identifier (V) can also occur via communication from another device via electrical or electromagnetic means.

In one particular embodiment the secret (K) used to generate an authentication code 90 evolves with the passage of time. In this embodiment, the secret (K) may evolve each second, each minute, each hour, each day, each month, or each year. This may be accomplished by generating representing secret (K) as a set of secrets: one corresponding to the current year ($K_Y$), one corresponding to the current month ($K_M$), one corresponding to the current day ($K_D$), one corresponding to the current hour ($K_H$), and one corresponding to the current minute ($K_{MIN}$), that is, $$K=(K_Y, K_M, K_D, K_H, K_{MIN})$$

In these embodiments, the secret (K) may be used to generate the authentication code 90.

For example, the yearly secret ($K_Y$) may be generated by using a block cipher with a seed secret as the key and the current year, appropriately padded, as the data value. For example, an embodiment using a 128 bit block cipher, the current year value (0000-9999) may be padded with 0's, 1's, or some random pattern that is known to the verification computer 150, in order to provide a 128 bit data block. Thus, $$K_Y = E_K(\text{YYYYPPPPPPPPPP})$$

where P represents padding and $E_K$ represents a block cipher of the data YYYY using the seed secret as the key. In a similar manner, a monthly secret may be derived by applying a block cipher a second time:

$$K_M = E_{KY}(\text{YYYYMMPPPPPPPPPP})$$

where YYYYMM represents the current month and year values and the yearly secret is used as the key to the block cipher. Daily and hourly seeds can similarly be generated:

$$K_D = E_{KM}(\text{YYYYMMDDPPPPPP}) \text{ and}$$

$$K_H = E_{KD}(\text{YYYYMMDDHHPPPP}).$$

In certain of these particular embodiments, each of the secrets may be used during a time interval responsive to the generation value (N). For example, an initial authentication code 90 may be provided during the first authentication code generation during a time interval. If a second authentication code is required during that same time interval, the user authentication device 120 may choose one of the yearly secret, the monthly secret, the daily secret, or the hourly secret to provide as input to the combination function 130 to generate the authentication code 90. Alternatively, a new minute secret may be generated to create a new secret (K) that may be used as input to the combination function 130. In other embodiments the secret (K) may evolve automatically. That is, new secrets may be generated at the expiration of specific time periods. Although the above example has been given with respect to block ciphers, any of the methods described here for generating the secrets may be used (e.g. hash functions). Other techniques for generating new seed values are described in U.S. Pat. No. 5,361,062, the contents of which are incorporated herein by reference.

Figure 3:
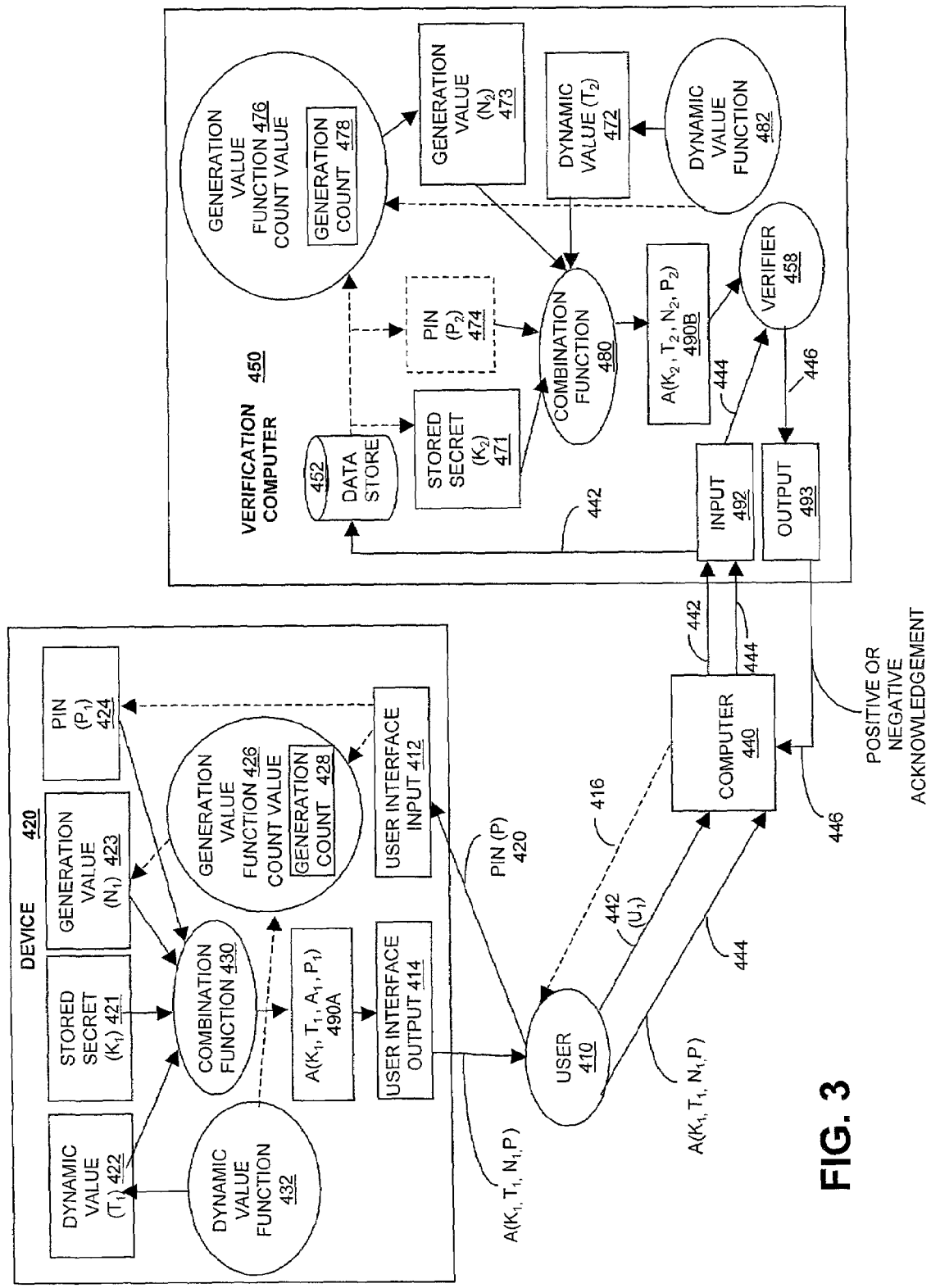
FIG. 3 is a diagram illustrating an embodiment of a system for securely authenticating the identity of the user that uses an authentication device allowing the user to input a personal identification number (PIN) via a user interface.

Referring to FIG. 3, in one embodiment, an authentication device 420 allows a user 410 to enter a PIN value 420 via a user input interface 412, which is implemented as a keypad. In this embodiment, the PIN value 424 is the binary representation of the entered PIN. In other embodiments, the PIN may be provided as input to one or more functions such as a key derivation function, to generate the PIN value 424.

The authentication device 420 implements a dynamic value function 432, which includes a timer (not shown) that keeps the current time. The dynamic value function 432 changes the dynamic value 422 once each time interval. In this embodiment, the time interval is one minute, and the dynamic value is the number of seconds since a predetermined date at the beginning of each one minute time interval. In one embodiment, the dynamic value function 432 determines the dynamic value 422 at the beginning of each time interval. In other embodiments the dynamic value function 432 determines the dynamic value 422 only when an authentication code is generated. In these embodiments, a generation value may be combined with other quantities to arrive at the dynamic value 422.

The authentication device 420 may also implement a generation value function 426, which stores a generation count 428. In one embodiment, the generation count 428 represents the number of code generations performed by the authentication device 420. In other embodiments, the generation count 428 represents the number of code generations that have taken place during a particular time interval. In these other embodiments the dynamic value function 432 signals the generation value function 426 to reset the generation count 428 to a default value (e.g., 0) at the beginning of each time interval. Initiation of a code generation, for example by entry of the PIN, causes the generation value function 426 to increment the generation count 428 and to generate a generation value 423. In this embodiment, the generation value 423 is the generation count. In other embodiments, the generation value 423 is determined by the generation value function 426 by applying the generation count 428 as an input to one or more functions such as a key derivation function.

In some embodiments, the authentication device 420 also optionally allows the user to enter a verifier identifier (not shown) via the user interface input 412. In some embodiments, communication of the verifier identifier into the device 420 initiates generation of the authentication code 490A and possibly a change in the generation count 428.

In this embodiment, authentication code generation is initiated by entry by the user of a predetermined number of digits as a PIN. In another embodiment, a separate button may used to initiate authentication code generation, and in another embodiment, the entry of a verifier identifier initiates authentication code generation. Once authentication code generation is initiated, the combination function 430 receives the stored secret 421, the dynamic value 422, the generation value 423, and the PIN value 424. In one embodiment, the combination function 430 combines these values by applying these values as input to a block cipher. For example, in one embodiment the stored secret (421) is the block cipher encryption key and the dynamic value (422) and the generation value (423) are provided as block cipher input. The output may be parsed into one or more intermediate results, any one of which may be EXCLUSIVE-ORed with the PIN (valve 424) to produce the authentication code 490A. The authentication code 490A may be converted to hexadecimal or decimal format, and communicated to the user 410 via the user interface output 414, which in one embodiment is an LCD display.

In some embodiments, the combination function 430 can determine the combination of (the stored secret 421, the dynamic value 422, and the generation value 423), referred to as a pseudo-random number (PRN), while the user 410 is entering a PIN value. The entered PIN is thus combined with the combined value. The first (K, T, N=0) combination can be computed at the initiation of each time interval. The device 420 may be designed such that the memory elements used by the combination function 430 for storing intermediate and final results destroy themselves upon an attempt to physically or electrically access the device. In other embodiments, the logic implementing the combination function 430 may include one or more fusible links designed to destroy the logic implementing the combination function 430 upon an improper attempt to gain access to the user authentication device 420.

The user 410 reads the authentication code 490A from the device 420 user interface output 414, and tenders that authentication code to the computer 440 for verification. In this embodiment, the computer 440 is a personal computer in communication with the verification computer 450 over a computer network. In some embodiments, the computer 440 and the verification computer 450 are the same machine. In other embodiments, the computer 440 may be directly connected to the verification computer 450, part of or integrated with the verification computer 450, or in communication with the verification computer 450 over a telephone line (e.g. via modem) or wireless link.

The user 410 communicates a user identifier ($U_1$) 442 and the authentication code 444 to the computer 440, which in turn provides that information to the verification computer 450. The verification computer receives the user identifier 442 and the authentication code 444 via the input 492. The verification computer 450 uses the user identifier ($U_1$) 442 to retrieve the stored secret (K) 471 associated with the user's device 420 and the user's PIN value (P) from a data store 452.

The verification computer 450 also includes a generation value function 476 that is functionally similar to the generation value function 426 in the user device 420. The verification computer 450 uses the number of authentication attempts by a user 410 during a time interval, as reflected in a generation count 478 to determine a generation value 473 to use with the combination function 480. The verification computer 450 also includes a dynamic value function 482 that generates a dynamic value 472 that is approximately synchronized with the dynamic value 422. In one particular embodiment, the verification computer 450 uses multiple generation values to calculate multiple values against which to compare the authentication code received from the user. For example, the verification computer 450 may calculate values corresponding to N=0, N=1 and N=2 and compare those values to the received authentication code. This embodiment allows the verification computer 450 to correctly authenticate a user, even if the user device and the verification computer 150 have different generation values. The user device and the verification computer can lose synchronization of generation values when, for example, the communications link between the user authentication device and the verification computer fails. In this event, the user authentication device increments its generation value but the verification computer does not.

The stored secret 471, the PIN value 474, the generation value 473 and the dynamic value 472 are combined by the combination function 480 to generate an authentication code 490B. The generated authentication code 490B is compared to the received authentication code 444 by the verifier 458. If they are the same, then the user is authenticated. If they are different, the authentication fails.

To allow for the case where the clocks associated with the dynamic value functions 432, 482 on the device 420 and the verification computer 450 are not precisely synchronized, it may be useful to try several dynamic values that are approximately the correct values (e.g. the interval before and the interval after) and to store and use an appropriate time offset to synchronize the clocks in the future. Techniques for synchronizing clocks between the user authentication device and the verification computer are described in U.S. Pat. No. 4,885,778 to Weiss. This synchronization may occur in addition to the generation value adjustment described above.

A message 446 can be sent to the computer 440 to indicate whether the authentication was successful. This information may or may not be communicated to the user 410. In this embodiment, this message 446 is a positive or negative acknowledgement. In other embodiments, it may be that the user is simply allowed access to data or to the computer 440.

Figure 4:
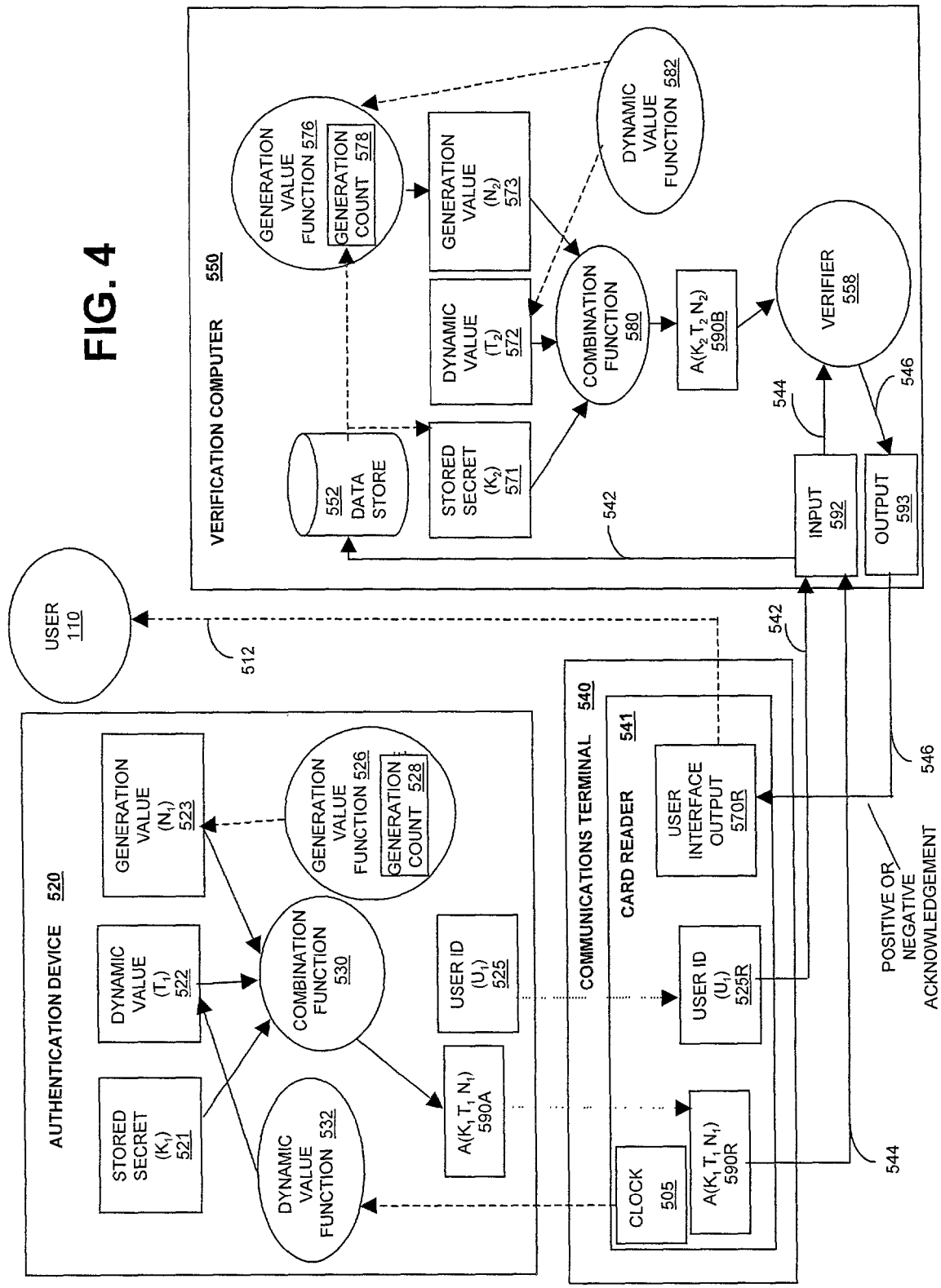
FIG. 4 is a diagram illustrating an embodiment of a system for securely authenticating the identity of the user that uses an authentication device shaped in the form of a card that is processed by a card reader device.

Referring to FIG. 4, in one embodiment, an authentication device 520 generates an authentication code 590A. Here, the device is a "smart card," which is a microprocessor with memory mounted on a card. When the card is inserted in a reader 541, power is supplied to the processor, and communication between the card 520 and the reader 541 is established. The device 520 is capable of being read or processed by a card reader 541 residing as part of a communications terminal 540. The device 520 also stores a user identifier (U) 525. In other embodiments, the device may be provided as a Subscriber Identity Module (SIM) chip.

The authentication device 520 includes a dynamic value function 532. The current time is supplied to the dynamic value function 532 by a clock 505 in the terminal 540. The dynamic value function 532 changes the dynamic value 522 once each time interval. In this embodiment, the time interval is one minute, and the dynamic value is the number of seconds since Dec. 20, 1989 at the beginning of each one minute time interval. At the beginning of each time interval, the dynamic value function 532 determines the dynamic value 522. For embodiments in which the user authentication device is a smart card, the current time may be downloaded to the smart card by the reader. In these embodiments, the smart card may use a technique known as "ratcheting" to ensure that a downloaded time value is later than the last time value downloaded.

The authentication device 520 also includes a generation value function 526. In some embodiments the generation value function 526 stores a generation count 528. In other embodiments, the generation count 528 is derivable from the received authentication code. For example, the user authentication code may be transmitted along with the value of the generation count used. The generation count 528 represents the number of code generations that have taken place during a time interval. At the beginning of each time interval, the dynamic value function 532 signals the generation value function 526 to reset the generation count 528 to a default value 0. Initiation of a code generation, for example by a request for an authentication code by the card reader 541 causes the generation value function 526 to increment the generation count 528 and to generate a generation value (N) 523. In this embodiment, the generation value 523 is equal to the generation count 528. In other embodiments, the generation value 523 is determined by the generation value function 526 by applying the generation count 528 as an input to one or more functions such as a key derivation function.

In this embodiment, authentication code generation is initiated when the card reader 541 reads the device 520. Once authentication code generation is initiated, the combination function 530 receives the stored secret (K) 521, the dynamic value (T) 522, and the generation value (N) 523. The combination function 530 combines these values by applying these values as input to a block cipher or in such other manner as described above. As a result, an authentication code 590A is generated. The authentication code 590A is communicated to the verification computer 550 by the terminal 540.

In this embodiment, the terminal 540 is a personal computer that includes smart card reader hardware and that is in communication with the verification computer 550 over a computer network. In other embodiments, the computer 540 may be directly connected to the verification computer 550, part of or integrated with the verification computer 550, or in communication with the verification computer 550 over a telephone line or wireless link.

The card reader 541 communicates 542, 544 a user identifier ($U_1$) 525R and the authentication code 590R both read from the device 520, to the computer 550, which in turn provides that information to the verification computer 550. The verification computer receives the user identifier 542 and the authentication code 544 via the input 592. The verification computer 550 uses the user identifier ($U_1$) to retrieve the stored secret (K) 571 associated with the user's device 520 from a data store 552. In other embodiments, the user identifier is provided by some other means—keyboard entry of an identifier, recognition of a biometric characteristic, and so on.

The verification computer 550 also includes a generation value function 576 that is functionally similar to the generation value function 526 in the user device 520. The verification computer 550 uses the number of authentication attempts during a time interval, as reflected in a generation count 578 to determine a generation value 573 to use with the combination function 580. The verification computer 550 also includes a dynamic value function 582, which generates a dynamic value 572 that is approximately synchronized with the dynamic value 522.

The stored secret 571, the dynamic value 572, and the generation value 573 are combined by the combination function 580 to generate an authentication code 590B. The generated authentication code 590B is compared to the device-generated authentication code 590A received from the communications terminal 540. It they are the same, then the user is authenticated. If they are different, the authentication fails.

As above, to allow for the case where the clocks are not precisely synchronized, it may be useful to try several dynamic values that are approximately the correct values (e.g. the interval before and the interval after) and to store and use an appropriate time offset to synchronize the clocks in the future, as described in U.S. Pat. No. 4,885,778 to Weiss.

A message 546 can be sent to the communications terminal 540 to indicate that the authentication was successful; this information 512 may or may not be communicated to the user 110. In this embodiment, this message 546 is a positive or negative acknowledgement. It may be that the user is simply allowed access to data or to the communications terminal 540. In other embodiments, the message 546 can be sent to an application, computing resource, or network to which the user is seeking access. The message 546 may be sent to a computing resource (such as a computing device, desktop computer, laptop computer, or handheld computing device) that is different from the communications terminal 540.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method for generating an authentication code associated with an entity, the method comprising the steps of:
   retrieving a stored secret associated with an entity;
   determining a dynamic value associated with a time interval;
   retrieving a first generation value indicative of a number of previous authentication code generations within the time interval;
   receiving a personal identification number (PIN);
   generating an authentication code by combining the stored secret, the dynamic value, the first generation value, and the PIN; and
   generating a second generation value in response to receipt of the PIN.

2. The method of claim 1 further comprising the step of receiving verifier information, and wherein the generating step comprises combining the stored secret, the dynamic value, the first generation value, the PIN, and the verifier information.

3. The method of claim 2 wherein the step of generating the authentication code comprises:
   combining the stored secret and the dynamic value to form a first result;
   combining the verifier information with the first result to form a second result; and
   combining the first generation value with the second result.

4. The method of claim 1 wherein the step of generating the authentication code comprises:
   combining the stored secret and the PIN to form a first result;
   combining the dynamic value with the first result to form a second result; and
   combining the first generation value with the second result.

5. The method of claim 1 wherein the step of generating the authentication code comprises:
   combining the stored secret and the first generation value to form a first result;
   combining the dynamic value with the first result to form a second result; and
   combining the PIN with the second result.

6. The method of claim 1 wherein the step of generating the authentication code comprises:
   combining the stored secret and the dynamic value to form a first result; and combining the first generation value with the first result.

7. The method of claim 1 wherein the step of generating the authentication code comprises:
   combining the stored secret and the first generation value to form a first result; and
   combining the dynamic value with the first result.

8. The method of claim 1 wherein the step of generating the authentication code comprises:
   combining the dynamic value and the first generation value to form a first result; and
   combining the stored secret with the first result.

9. The method of claim 1 wherein the step of determining the dynamic value comprises determining a dynamic value responsive to a time-based counter.

10. The method of claim 1 wherein the step of determining a generation value comprises incrementing a generation counter for an authentication code generated during the time interval.

11. The method of claim 10, further comprising the step of resetting the generation counter at the start of a second time interval.

12. The method of claim 1 further comprising the step of the displaying the authentication code on a display.

13. The method of claim 1, wherein the PIN is retrieved from a data store.

14. The method of claim 1, further comprising the step of selecting a combination function based on the first generation value.

15. The method of claim 1, wherein the step of retrieving a stored secret comprises retrieving one of a plurality of stored secrets based on the first generation value.

16. A system for generating an authentication code associated with an entity, the system comprising:
   a memory element storing a secret associated with an entity;
   a dynamic value subsystem determining a dynamic value associated with a time interval;
   a personal identification number (PIN) subsystem receiving a PIN;
   a first generation value subsystem determining a first generation value indicative of a number of previous authentication code generations within the time interval and calculating a second generation value in response to receipt of the PIN by the PIN subsystem; and
   a combination subsystem generating an authentication code by retrieving the secret from the memory element and combining the secret with the dynamic value from the dynamic value subsystem, the PIN received by the PIN subsystem, and the generation value from the generation value subsystem.

17. The system of claim 16 wherein the PIN subsystem further comprises a keypad.

18. The system of claim 16 wherein the combination subsystem combines the stored secret and the dynamic value to form a first result, combines the PIN with the first result to form a second result, and combines the first generation value with the second result.

19. The system of claim 16 wherein the combination subsystem combines the stored secret and the PIN to form a first result, combines the dynamic value with the first result to form a second result, and combines the first generation value with the second result.

20. The system of claim 16 wherein the combination subsystem combines the stored secret and the first generation value to form a first result, combines the dynamic value with the first result to form a second result, and combines the PIN with the second result.

21. The system of claim 16 wherein the combination subsystem combines the stored secret and the dynamic value to form a first result, and combines the first generation value with the first result.

22. The system of claim 16 wherein the combination subsystem combines the stored secret and the first generation value to form a first result, and combines the dynamic value with the first result.

23. The system of claim 16 wherein the combination subsystem combines the dynamic value and the first generation value to form a first result, and combines the stored secret with the first result.

24. The system of claim 16 wherein the dynamic value subsystem comprises a time-based counter, and the dynamic value subsystem determines a dynamic value responsive to the counter.

25. The system of claim 16 wherein the generation value subsystem comprises a generation counter that is incremented for each generation of the authentication code during the time interval.

26. The system of claim 25, wherein the generation value subsystem resets the generation counter at the start of a second time interval.

27. The system of claim 16 further comprising a display for displaying the generated authentication code.

28. The system of claim 16 wherein the generation value subsystem changes the generation value upon activation of a button.

29. The system of claim 16 wherein the PIN subsystem further comprises a data store for storing the PIN associated with a user.

* * * * *